United States Patent [19]
Howard et al.

[11] Patent Number: 5,196,236
[45] Date of Patent: * Mar. 23, 1993

[54] INK JET COLOR PRINTING METHOD

[75] Inventors: Robert Howard, New York, N.Y.; Richard R. Helinski, Hudson; Herbert E. Menhennett, Windham, both of N.H.

[73] Assignee: Howtek, Inc., Hudson, N.H.

[ * ] Notice: The portion of the term of this patent subsequent to May 3, 2005 has been disclaimed.

[21] Appl. No.: 571,298

[22] Filed: Aug. 22, 1990

Related U.S. Application Data

[60] Division of Ser. No. 402,028, Sep. 1, 1989, abandoned, which is a continuation of Ser. No. 128,462, Feb. 9, 1988, abandoned, which is a continuation of Ser. No. 921,345, Oct. 20, 1986, Pat. No. 4,741,930, which is a division of Ser. No. 688,000, Dec. 31, 1984, abandoned.

[51] Int. Cl.$^5$ .................. B05D 5/06; B05D 1/02; B05D 1/36
[52] U.S. Cl. ........................... 427/265; 346/1.1
[58] Field of Search .................. 346/135.1, 1.1; 427/261, 265

[56] References Cited

U.S. PATENT DOCUMENTS

| | | | |
|---|---|---|---|
| 2,322,445 | 6/1943 | Huber | 101/426 |
| 3,607,808 | 9/1971 | Thompson | 524/273 |
| 3,653,932 | 4/1972 | Berry et al. | 106/22 |
| 3,715,219 | 2/1973 | Kurz et al. | 106/22 |
| 3,951,668 | 4/1976 | Schumacher et al. | 106/20 |
| 4,234,635 | 11/1980 | Atkinson | 428/80 |
| 4,272,590 | 6/1981 | Blank | 428/460 |
| 4,320,406 | 3/1982 | Heinzl | 346/140 R |
| 4,371,104 | 2/1983 | Korte | 225/48 |
| 4,386,193 | 5/1983 | Reich et al. | 526/298 |
| 4,390,369 | 6/1983 | Merritt et al. | 106/31 |
| 4,666,757 | 5/1987 | Helinski | 428/203 |
| 4,741,930 | 5/1988 | Howard et al. | 427/265 |

FOREIGN PATENT DOCUMENTS

| | | |
|---|---|---|
| 0021389 | 1/1981 | European Pat. Off. . |
| 0099682 | 2/1984 | European Pat. Off. . |
| 47-34588 | 10/1972 | Japan . |
| 1114532 | 11/1972 | Japan . |
| 48-36392 | 11/1973 | Japan . |
| 49-103639 | 10/1974 | Japan . |
| 55-54368 | 4/1980 | Japan . |
| 58-140257 | 8/1983 | Japan . |
| 1-294429 | 11/1989 | Japan . |
| 543393 | 2/1942 | United Kingdom . |

OTHER PUBLICATIONS

The Institute for Graphic Communication, Conference Data For Continuing Education Program, 1981, pp. 1-10 (C. A. Muench et al.), "Tricolor Ink Jet System."
Teletronix, Inc., technical brochure on TEK 4695 Color Graphics Copier, 1983.
Advanced Color Technology, technical brochure on ACT-1 Color Copier, undated.
"British Standard Four-Colour and Three-Colour, Letterpress Process Inks", B. S. 1480; 1949 pp. 2-9, British Standards House, London, England.

Primary Examiner—Evan Lawrence
Attorney, Agent, or Firm—Cesari and McKenna

[57] ABSTRACT

Color printing characterized by high color density and color contrast is provided by jetting an ink composition composed of an optically clear, phase change base material and a primary subtractive color dye which is soluble in the base material onto the surface of a printing medium to form a multiplicity of closely spaced color dots or spots arranged to define a line or character on the medium. Each dot consists of one or more well defined, optically clear, semitransparent color layers each of which has a different color so that the observed color of each dot is a true subtractive mixture of the colors in the layers. Specific ink compositions are also disclosed.

9 Claims, 1 Drawing Sheet

INK JET COLOR PRINTING METHOD

RELATED APPLICATIONS

This application is a division of Ser. No. 07/402,028, filed Sep. 1, 1989, now abandoned, which is a continuation of Ser. No. 07/128,462, filed Feb. 9, 1988, now abandoned, which is a continuation of Ser. No. 06/921,345, filed Oct. 20, 1986, now U.S. Pat. No. 4,741,930, which is a division of Ser. No. 06/688,000 filed Dec. 31, 1984, now abandoned.

This invention relates to ink jet color printing. It relates more particularly to an ink jet ink composition that produces unusually high quality, high density color printing.

BACKGROUND OF THE INVENTION

Ink jet printing systems can be divided into the continuous jet type and the drop-on-demand type systems. In the former, a succession of drops are ejected from a small nozzle and projected electrostatically toward a recording medium such as a paper sheet. Selected drops are deflected electrostatically into a gutter, while the remaining drops impinge on and adhere to the sheet to form a character or figure on the paper according to a predetermined dot matrix. In the drop-on-demand or impulse jet type printer, the volume of a pressure chamber filled with ink is suddenly decreased by the impression of an electrical driving pulse and an ink drop is jetted from a nozzle communicating with the chamber. Thus, a single drop of ink is transferred to the paper by a single driving pulse, following which the system returns to its original state. In use, a succession of such droplets is ejected in response to a succession of drive pulses to form a character or figure on the paper according to a predetermined dot matrix. Examples of such printers are disclosed in U.S. Pat. Nos. 3,653,932; 3,715,219 and in U.S. application Ser. No. 571,094, filed Jan. 16, 1984, entitled Droplet Ejector, owned by the assignee of the present application. While the present invention is applicable to both types of ink jet printing, we will describe it specifically in relation to drop-on-demand ink jet printing.

There are several requirements for an ink composition used in an impulse jet printing process. The physical properties of the ink such as viscosity and surface tension must be within proper ranges if the ink is to be jetted properly. The ink must not clog the nozzle orifice. It must produce images of sufficient optical density. Further, the ink must have a high rate of fixing to the recording medium and not wrinkle, curl or otherwise adversely affect the medium. Further, the ink must be able to form high resolution substantially circular dots on the recording medium which are resistant to water, common solvents, light and abrasion. Since we are concerned here specifically with ink jet color printing, it is desirable if not essential also that the ink be capable of printing in three primary colors as well as in black to produce characters and pictures in a very wide variety of different colors and hues. Satisfactory color printing by ink jet involves, then, the formation on the recording medium of a multiplicity of colored dots or spots of differing color intensities, depending upon the requirements of the various parts of the character or picture being printed on the medium.

This wide color printing spectrum can be achieved using three or four different color inks either by an additive color mixing process or a subtractive process. In the former, red, green, blue and sometimes black ink drops are deposited on the medium side by side in a dot matrix. The different colored drops are integrated in the observer's eyes so that he perceives a color dependent upon the relative numbers and/or sizes of the different color dots at each part of the printed character or picture. In the subtractive process, the printer deposits ink drops of the primary subtractive colors, namely cyan, magenta and yellow, as well as black, on the medium in superposition in a dot matrix so that each dot is composed of one or more layers, up to three or four, of printing inks having different color intensities, depending upon the color requirements of the particular part of the character or picture. Each dot layer absorbs a portion of the spectrum of the ambient light illuminating the medium so that the viewer's eye senses the remainder of the light spectrum. Thus, when several ink layers each of a different primary color are present in a single dot in the matrix, several spectral portions are absorbed simultaneously so that a smaller part of the spectrum of the incident light is reflected causing the viewer's eye to sense a mixed color produced by the subtractive mixture of the primary colors.

Thus, true color printing using a subtractive color mixing process depends upon the precision of the printing process as well as the optical properties of the different color printing inks. The color graphics industry prefers to print by subtractive color mixing because the resultant color printing is brighter and more vivid than that resulting from additive color mixing, particularly when the power of the ambient light is relatively low.

Presently, two different types of inks are usually used for ink jet printing, namely water-based inks and oil-base inks and there are many known water- and oil-based inks that can be jet-printed onto a printing medium to produce characters and pictures in color by both the additive and the preferred subtractive color mixing processes. However, such inks have certain drawbacks. More particularly, water-based inks exist on the medium, usually paper, as very thin layers and they get imbibed into the paper. The resultant interaction of the water and the paper fibers distorts the paper. It also results in the incident light being reflected diffusely from the color dots so that the observed printed colors are muted. Of course, the paper can be specially treated to avoid this problem. However, that is a limiting factor and adds to the expense of the color printing process. Oil-based inks also tend to penetrate a paper printing medium producing diffuse reflections which mute the observed colors. Further, they have low surface tensions so that, when deposited on the paper, they tend to wick along the paper fibers resulting in overly large and rather irregular printing dots.

According it would be desirable to be able to provide subtractive color printing by an ink jetting process which is brighter and more vivid than that produced by conventional ink jet color printing systems. This necessarily involves the providing of an ink composition which does not adversely affect the printing medium upon which it is placed and whose colors are not muted or otherwise adversely affected by that printing medium. Preferably also the ink composition should be applicable to ordinary untreated paper which is the most common and least expensive printing medium.

SUMMARY OF THE INVENTION

Accordingly, it is an object of the present invention to provide an ink jet ink which will adhere to the surface of a printing medium to produce color printing having a high optical density.

Another object of the invention is to provide an ink composition that can be jetted onto a printing medium such as ordinary untreated paper stock to produce high resolution printed characters and figures in vivid color.

A further object of the invention is to provide a color printing system which produces characters on a recording medium comprised of high resolution colored dots having good circularity.

Still another object of the invention is to provide a jet ink for subtractive color printing whose optical characteristics are not adversely affected by the printing medium to which the ink is applied.

Yet another object of the invention is to provide an ink of this type which does not adversely affect the paper or other medium to which it is applied.

Another object of the invention is to provide a jet ink of the type just described which is scratch resistant, substantially unaffected by accidental contact with water and other liquids in common use and is able to withstand the temperature and humidity extremes normally encountered by printed documents.

A further object of the invention is to provide subtractive color printing by jetting individual ink drops from an ink jet printer to a printing medium to form vivid colored lines and characters composed of closely spaced, well defined dots.

Another object of the invention is to provide jet-printed colored indicia or printing on ordinary paper characterized by high color brightness, optical density and color contrast.

Other objects will, in part, be obvious and will, in part, appear hereinafter.

The invention accordingly comprises the several steps and the relation of one or more of such steps with respect to each of the others, and the apparatus embodying the features of construction, combination of elements and arrangements of parts which are adapted to effect such steps, all as exemplified in the following detailed description, and the scope of the invention will be indicated in the claims.

Briefly in accordance with the present invention, high quality color printing is produced by jetting phase change colored inks in liquid form from a jet printer to a printing medium. Upon contact with the medium surface, the inks set and adhere to that surface so as to form colored printing composed of one or more semitransparent or translucent primary subtractive color layers. Preferably the printing is applied as individual ink drops so that the printing is composed of side-by-side, tiny, well defined, layered dots in a dot matrix arrangement. The printing layers in each dot, each of a different primary color, simultaneously absorb different portions of the ambient light spectrum so that the viewer's eye senses a mixed color produced by the subtractive mixture of the primary colors in those layers. For example, printed dots composed of cyan and magneta layers would absorb the red and green components of the white light spectrum so that those dots would be seen as blue. On the other hand, dots composed of cyan and yellow layers which absorb the red and blue portions of the light spectrum, would be seen as green.

The ink composition used in the present process is a so called hot melt or thermoplastic ink with a wax base. It should be mentioned at this point that hot melt inks generally are known and have been used to some extent by the printing industry. Indeed U.S. Pat. Nos. 3,607,808; 3,653,932; 3,715,219 and 4,390,369 disclose various thermoplastic inks suitable for jet printing onto a recording medium. However, such inks have only been applied to the medium as single layers to form black printing i.e., text, or to print side-by-side colored dots which together define the colored character by the additive color mixing process described above. As far as applicants are aware, these prior thermoplastic ink compositions have never been used to produce multilayered semitransparent color printing by the subtractive color mixing process preferred by printers.

It is a well known fact that the printing and graphic industries have long been dissatisfied with the presently available aqueous and oil-based inks. Tremendous effort and large sums of money have been devoted to developing ink compositions for color printing to alleviate the problems discussed above associated with conventional subtractive color printing inks. Despite this long felt need and despite the large sums of money expended to improve these inks, no one until now has thought to print colored characters and lines on a printing medium by jetting phase-change wax-based inks onto the printing medium in distinct strata or layers, with the different layers being semitransparent and giving color to the printing by subtractive color mixing. One can speculate on the reasons why no one has thought to use phase change wax-based inks in this way. One reason might be that one expects a wax-based ink, like a candle, to be too opaque to transmit sufficient light for effective subtractive color mixing. Also it would not readily occur to one that such wax-based inks could be applied in superimposed layers each having a thinness to permit selective absorption by the different layers. Whatever the reasons, the fact is that as far as applicants are aware, they are the first ones to jet phase-change wax-based inks from a jet printer onto a recording medium in superimposed layers, with each layer being of a different primary color and having a thinness such that the color of the printing is a true subtractive mixture of the colors in the different layers.

Utilization of such wax-based inks in this way in a jet printing process yields several advantages. The waxed-base ink forming the first dot layer does not penetrate into the recording medium even if that medium is ordinary untreated paper stock. Although the ink is jetted to the recording medium as a heated liquid, as soon as it strikes the relatively cool surface of that medium it sets and adheres to the medium surface without imbibing into the medium so that the resulting printing sits right on that surface. Accordingly, the ink does not distort the medium. Nor does the medium interact with the ink to cause material light scattering which could mute the color of the printing. Still further, since each ink layer sets immediately upon reaching the medium surface or a previously applied layer, each layer is well defined and there is not turbid mixing of the ink colors. Rather there is a definite boundary between the adjacent differently colored ink layers so that the perceived color of the printing is a true subtractive mixture of the colors of those layers. Therefore, printing can be applied to almost any printing medium, including coarse untreated paper stock, which is well defined, unusually bright and vivid and has high color contrast. Also, of course, since the ink compositions are waxed-based, the resulting print or indicia on the printing medium is scratch resistant and is substantially unaffected by common fluids, including water, and by the temperatures that would normally be encountered by printed matter in the mails and elsewhere.

BRIEF DESCRIPTION OF THE DRAWING

For a fuller understanding of the nature and objects of the invention, reference should be had to the following detailed description, taken in connection with the accompanying drawing, in which.

DETAILED DESCRIPTION OF THE PREFERRED EMBODIMENT

Figure 1:
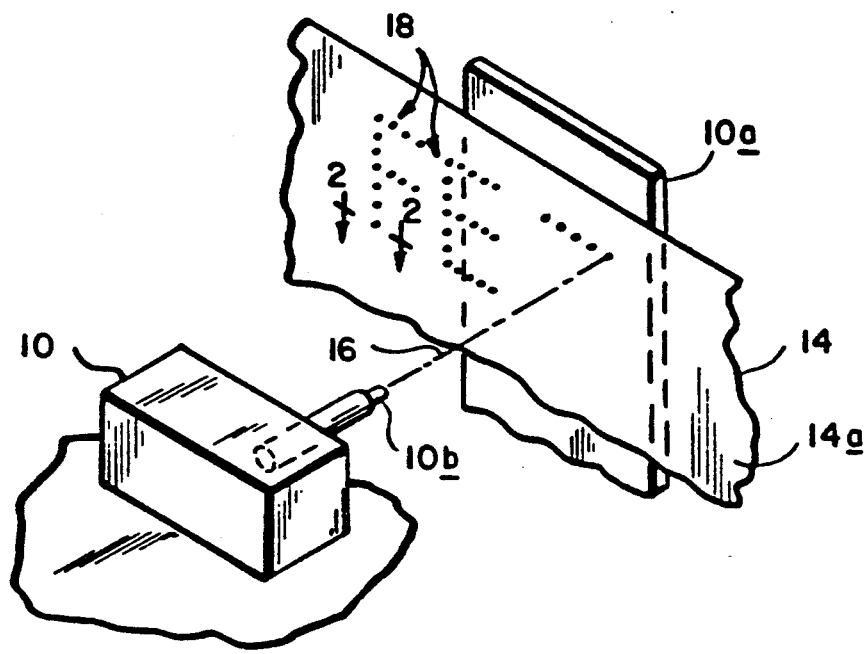
FIG. 1 is a diagrammatic view of a color printing system embodying the principles of this invention.

Refer now to FIG. 1 of the drawing which shows a system for color printing in accordance with our technique. It comprises a printer 10 which applies color printing to a recording medium 14 such as sheet of ordinary paper positioned against the printer platen 10a. The printer 10 specifically illustrated is an impulse jet or a drop-on-demand type printer. It may be a conventioned jet printer or be a printer similar to the one disclosed in the aforesaid pending application. Suffice to say that printer 10 contains separate supplies of differently colored thermoplastic phase change inks to be described in more detail later. The inks are maintained at an elevated temperature so that they can be jetted as individual drops 16 from separate printer nozzles 10b to the surface 14a of recording medium 14 in response to controlled drive signals applied to the printer. The ink drops impinge on and adhere to the medium surface 14a to form a multiplicity of dots or spots 18 spaced closed together in a dot matrix arrangement so that together the dots form one or more colored lines, characters or fields as determined by the signals controlling the printer.

Each of the differently colored inks jetted onto medium 14 is a non-aqueous thermoplastic or hot melt ink composed of a wax base material or carrier and a dye. The base material exists in a liquid phase when heated in printer 10 to a relatively high temperature (e.g. above 150° F.) and changes immediately (i.e. in less than 100 ms) to a solid phase upon striking the cooler surface of medium 14. At the jetting temperatures, the base material should have a viscosity of 1 to 50 centipoise and a surface tension of 20 to 50 dynes/cm² such that the ink can be propelled electrostatically by the printer 10 as small drops 16 to the recording medium to form dots or spots 18 on the medium surface 14a which are of a uniform small size (e.g., 0.5 to 8 mils). Also, when the base material sets it is relatively hard and scratch resistant. Thus the present ink, and particularly its base material, should have all of the desirable properties of the thermoplastic inks described in the above-mentioned patents used in uni-color or additive color printing. In addition, however, the base material of the present ink composition must be optically clear or non-turbid in both its solid and liquid states so that it is quite transparent to light energy and produces minimal light scattering. A suitable optically clear, phase change base material for our purposes is a fatty acid such as stearic acid.

The dye compound of each ink composition must be soluble in the base material in both phases of that material and not change the viscosity of the base material appreciably. Sufficient dye should be dissolved in the base material so that the jetted colored ink dots or spots 18 are intense and vivid with reflection densities (ANSI) of 1 to 3 and preferably in excess of 2. Since we are concerned here with printing by subtractive color mixing, the dye colors are usually the primary colors consisting of cyan, magenta, yellow and also black. As with any other dye used in color printing, the dye in the wax-based ink compositions here should have good post print stability. That is, it should be able to withstand the temperatures normally encountered by printed materials in the mails and during handling, which are usually no higher than 85° F.

The following are examples of suitable dyes:

| Cyan | Magenta | Yellow | Black |
|---|---|---|---|
| Atlasol Spirit blue THF | Atlasol Spirit Magenta M | Atlasol Spirit yellow BB | Atlasol Black M |
| Waxoline Blue AP.FW. | Rhodanine B | Savinyl Yellow RLSN | Savinyl Black RLS |
| Alphazurine Blue FGND | | Zapon Yellow 073 | |

Figure 2:
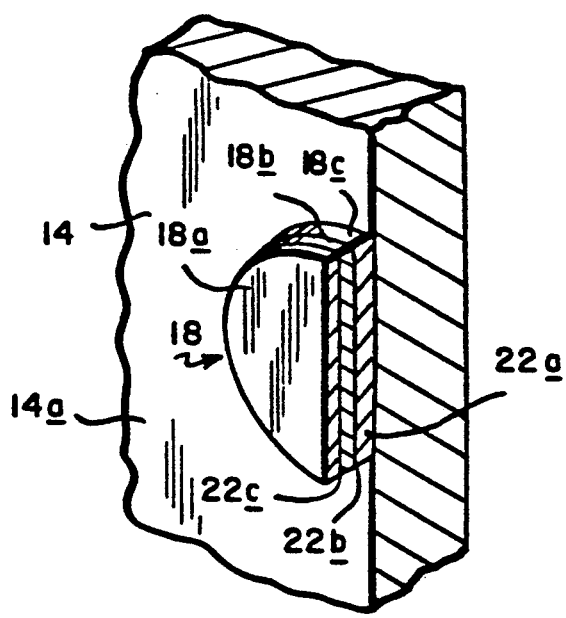
FIG. 2 is a sectional view on a much larger scale taken long line 2—2 of FIG. 1.

Refer now to FIG. 2 which shows in greater detail the plural layer structure of the dots 18. Each dot jetted onto the medium surface 14a comprises one or more precisely defined ink layers, with each layer being of a different primary color. Thus the dot specifically illustrated in FIG. 2 has three such layers 18a, 18b and 18c colored cyan, magenta and yellow respectively. The color density of each layer and its transparency are determined primarily by the thickness of that layer and that thickness can be varied by controlling the temperature (to vary viscosity) and size of the ink drop 16 that forms that layer. The thicknesses of the layers are quite small, i.e. less than 5 mil in order to obtain the requisite translucency. However, each layer should contain sufficient dye to have the required color density as noted above. Also, it should be noted that the thicknesses of the layers in a given printed dot 18 may be different depending upon the color requirements and, in fact, that is usually the case. For example, in a print specimen made in accordance with this invention, the ink dots comprising the printing may be composed of a cyan layer 18a closest to the surface 14a having a thickness of 2 mil, an intermediate yellow layer 18b superimposed on the cyan layer having a thickness of 1 mil and an outer magenta layer 18c superimposed on the layer 18b and having a thickness of 0.3 mil, with the dots as a whole being perceived as having a greenish color.

The successively jetted ink drops 16 comprising each printed dot 18 on medium 14 are spaced in time so that each drop sets before the next drop arrives so that the first ink layer 18a sits right on the surface 14a of the printing medium and so that all the layers form well-defined superimposed strata with definite boundaries 22a, 22b and 22c as clearly seen in FIG. 2. Thus, the ink in the first layer 18a is not imbibed into the printing medium 14 nor does it tend to wick along the fibers of that medium which phenomena could give rise to light scattering in the layer 18a. Further, since there is no interaction between the first ink layer 18a and the printing medium, almost any material can be used for that medium, even coarse paper stock, or open-weave fabric without appreciable loss of color brightness. This laying down of the different color inks as defined strata with sharply defined planar boundaries also insures that there is no turbid mixing of the ink colors between adjacent layers. Resultantly, each semitransparent ink layer 18a, 18b and 18c transmits light specularly rather than diffusely so that is functions as a high quality optical filter that filters out a well-defined portion or component of the white light spectrum. As a consequence, the layers comprising each dot 18 achieve true subtractive color mixing of the colors in those layers to produce a wide variety of selected dot colors which are especially bright and vivid. Accordingly, when different ink color combinations are used for the ink layers in adjacent printed dots 18, there is excellent color contrast between these different color dots.

Utilizing our printing process, then, high quality printed documents can be produced in color whose printed colored lines and color fields are characterized by high optical density and color brightness even when the ambient light intensity is relatively low. Accordingly, our process should find wide acceptance in the color printing and graphics industry which has long sought to provide high quality color printing by a subtractive color mixing process without incurring the difficulties stemming from the use of aqueous and oil-based printing inks.

Further, although we have specifically described ink compositions utilizing a wax as the ink base material or dye carrier, it is also possible to substitute other natural and synthetic, optically clear phase change materials such as oleic acid, polyethylene and blends or mixtures of such materials.

It will thus be seen that the objects set forth above, among those made apparent from the preceding description, are efficiently attained, and, since certain changes may be made in the above method and in the above construction without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

What is claimed as new and desired to be secured by Letters Patent of the United States is:

1. A method of color printing on a printing medium comprising the steps of jetting a first color phase-change ink as a liquid onto an area of a printing medium so that the first ink forms a first, thin, solid, semi-transparent, well-defined ink layer that adheringly covers without appreciably penetrating or distorting said medium area, and then jetting a second color phase-change ink as a liquid onto an exposed surface area of said first ink layer so that the second ink forms a second, thin, solid, semi-transparent well-defined ink layer that adheringly covers said first ink layer surface area whereby the ink layers transmit ambient light which is reflected from said medium back through said ink layers and provide subtractive color printing on said medium area that is characterized by high color density and brightness.

2. The method defined in claim 1 and further including the additional step of superimposing one or more additional said ink layers of different colors on said second ink layer.

3. The method defined in claim 1 wherein the different color inks are applied to said medium in selected different amounts so that the ink layers on said medium have selected different thicknesses.

4. A method of color printing on a printing medium by a jet melt method comprising the steps of
providing at least first and second phase change subtractive color printing inks, each consisting essentially of a wax-based thermoplastic base material which can exist in solid and liquid phases, and a subtractive color dye which is soluble in the base material in both phases and does not appreciably affect the viscosity of the base material;
jetting the inks onto the printing medium as successive liquid drops each of which at least partially solidifies prior to the impingement of a succeeding drop, for forming print composed of at least two layers of different colors which are superimposed, each layer with a controlled thickness and a well defined boundary with any adjacent layer so that specular reflection of ambient light occurs in each layer whereby the observed color of the print on said printing medium is a vivid subtractive mixture of the colors of all of said ink layers.

5. The method defined in claim 4 including the additional steps of jetting the inks so that said successive liquid drops have different sizes whereby selected ink layers have different thicknesses.

6. The method defined in claim 5 including the additional steps of jetting the inks so that each additional ink layer is thinner than the immediately underlying ink layer.

7. The method defined in claim 4 including the step of maintaining the inks to be jetted at an elevated temperature, at which the base material has a viscosity of 1 to 50 centipoise.

8. The method defined in claim 4 including the additional step of selecting each of said printing inks to have an optical density of from 1 to 3.

9. The method defined in claim 4 including the step of selecting the colors of said dyes from the group consisting of cyan, magenta, yellow and black.

* * * * *

UNITED STATES PATENT AND TRADEMARK OFFICE
CERTIFICATE OF CORRECTION

PATENT NO. : 5,196,236
DATED : March 23, 1993
INVENTOR(S) : Howard, et. al.

It is certified that error appears in the above-indentified patent and that said Letters Patent is hereby corrected as shown below:

On the Title page, under item [73], [*] Notice: should be --May 19, 2004--.

Signed and Sealed this

Fifteenth Day of March, 1994

Attest:

BRUCE LEHMAN

Attesting Officer    Commissioner of Patents and Trademarks